Jan. 21, 1958 R. SCHRECONGOST 2,820,894
TELEVISION SCANNING SYSTEM
Filed Sept. 4, 1953
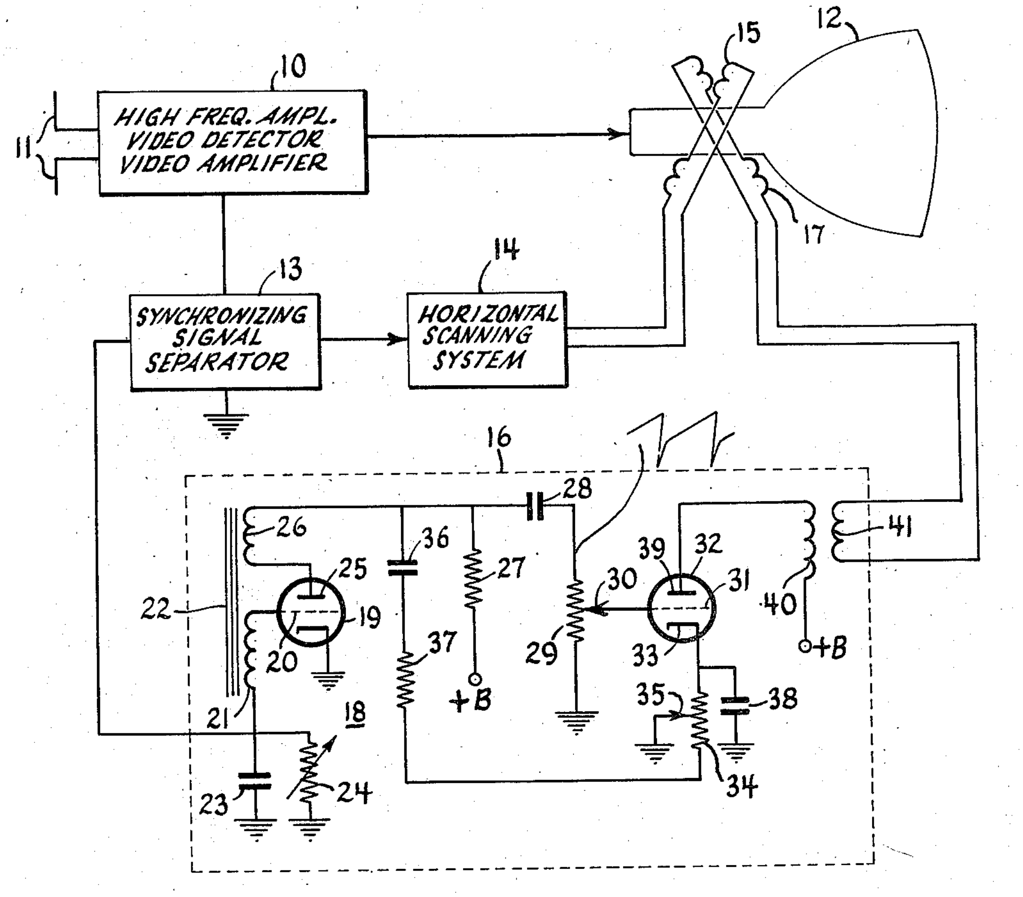
INVENTOR
RAY SCHRECONGOST
BY John A. Harvey
ATTORNEY 2,820,894

TELEVISION SCANNING SYSTEM

Ray Schrecongost, Kenmore, N. Y., assignor to Sylvania Electric Products Inc., a corporation of Massachusetts Application September 4, 1953, Serial No. 378,551

3 Claims. (Cl. 250—27)

The present invention relates to television scanning systems for cathode-ray tubes and, particularly, to magnetic scanning systems such as employed in the vertical scanning system of a television receiver.

The vertical scanning system of a conventional television receiver ordinarily supplies currents of saw tooth wave form to a vertical deflecting winding of a scanning yoke positioned about the neck of a cathode-ray tube type of image reproducing device by which to effect vertical deflection of the electron beam of the tube. These scanning currents ideally should have an exact linear wave form over the trace interval and the linearity should not vary with adjustment of the amplitude of the current for purposes of adjusting the height of the reproduced image. The economies required in the production of television receivers for home entertainment do not ordinarily permit the use of the more expensive forms of scanning systems which are capable of furnishing scanning currents of precise linear wave form, and the usual scanning system is therefor a compromise of several factors affecting the matter of linearity. The resulting linearity is approximate only and a linearity adjustment control is conventionally provided to modify the approximation of linearity from time to time as required by conditions of use of the receiver. Small adjustments of this linearity control are ordinarily satisfactory, but more extensive adjustments as required from time to time have the undesirable result that they cause the top of the reproduced image to "fold over" thus losing a portion of the useful picture area and requiring more extensive masking to mask this fold over area from view.

It is an object of the present invention to provide a new and improved television scanning system which largely avoids or eliminates the matter of fold over with adjustment of the linearity control of the scanning system.

It is a further object of the invention to provide a novel television scanning system in which the range of linearity control is improved without undesirable fold over of the reproduced image.

For a better understanding of the present invention, together with other and further objects thereof, reference is had to the following description taken in connection with the accompanying drawing, and its scope will be pointed out in the appended claims.

Referring now particularly to the single figure of the drawing, a television receiver includes a unit 10 having an input circuit coupled to an antenna 11 and an output circuit coupled to the intensity control electrodes of a cathode-ray tube type of image reproducer 12. Unit 10 is conventional and includes a high frequency amplifier, a video detector, and a video amplifier. The picture signal developed in the output circuit of the video detector of unit 10 is applied to a synchronizing signal separator 13 where the synchronizing signal components of the picture signal are separated from each other and from the video components thereof, the horizontal synchronizing components being applied to control the synchronized operation of a horizontal scanning system 14. The output circuit of the latter unit is coupled to a horizontal deflecting winding 15 of a scanning yoke positioned in conventional manner about the neck of the image reproducer 12. The vertical synchronizing signal components, separated from the television signal by the unit 13, are applied to a vertical scanning system 16 to control the synchronized operation thereof. The detailed arrangement and operation of the unit 16 will be described hereinafter, and it includes an output circuit which is coupled to a vertical scanning winding 17 of the deflection yoke.

With the exception of the scanning system 16, the construction and operation of the television receiver thus far described is conventional in that a television signal received by the antenna 11 is applied to the unit 10 where it is amplified, detected, and again amplified after detection before being used to control the intensity of the cathode-ray beam of the image reproducer 12. The horizontal and vertical synchronizing components of the received signal are separated by the separator 13 and are applied to the respective horizontal and vertical scanning systems 14 and 16 to control the synchronized operations thereof. The scanning signal applied from the output circuit of the unit 14 to the horizontal scanning winding 15 and the scanning signal applied to the vertical scanning winding 17 from the unit 16 cause the cathode-ray beam of the tube 12 to trace a raster of horizontal lines to reproduce the television image.

Referring now more particularly to the portion of the receiver embodying the present invention, the scanning system 16 includes means for generating a scanning signal of composite saw tooth and pulse wave form, this means comprising a conventional form of blocking oscillator 18 which includes a triode form of vacuum tube 19 having a control electrode 20 which is connected to ground through one winding 21 of a blocking oscillator transformer 22 and a condenser 23. An adjustable resistor 24 is connected across the condenser 23, and the vertical synchronizing signal developed in the output circuit of unit 13 is applied across the condenser 23 and resistor 24. The tube 19 also includes an anode 25 which is connected through a second winding 26 of the transformer 22 and a resistor 27 to a source of energizing potential indicated as +B. A scanning signal developed across the resistor 27 is coupled through a condenser 28 to a potentiometer 29 having an adjustable contact 30 which is connected to the control electrode 31 of a vacuum tube amplifier tube 32 of the triode type. The cathode 33 of this tube is connected to one end of the resistive element 34 of a potentiometer which has an adjustable contact 35 connected to ground. The blocking oscillator 18 includes in its output circuit a series-connected condenser 36 and resistor 37, and the latter is connected to the other terminal of the potentiometer 34 as shown. A condenser 38 is connected between the cathode 33 of the tube 32 and ground, and the anode 39 of tube 32 is coupled through the primary winding 40 of an output transformer to a source of energizing potential +B. The output transformer includes a secondary winding 41 which is coupled to the vertical deflecting winding 17 of the scanning yoke.

Considering now the operation of the scanning system just described, the blocking oscillator 18 operates in conventional manner to cause the tube 19 to become conductive during the retrace intervals of the scanning period and to become non-conductive during the relatively longer trace intervals. The synchronized operation of this oscillator is controlled in conventional manner by adjustment of the resistor 24 to cause the periodicity of the oscillator to be approximately equal to that of the synchronizing signal pulses supplied to the oscillator from the unit 13. Each time that the tube 19 becomes nonconductive, the condenser 36 charges from the source of potential +B through the resistor 27 of relatively large value, the condenser 36 discharging through the tube 19 during the conductive intervals of the latter to develop across the resistor 27 the saw tooth component of the desired scanning signal. The charging and discharging current of the condenser 36 also flows through the resistor 37 and the lower portion of the resistor 34, thus developing across the resistor 27 the pulse component of the desired scanning signal. The scanning signal of composite saw tooth and pulse wave form is applied to the amplifier 32 with an amplitude determined by adjustment of the potentiometer 29, 30 and the amplifier 32 amplifies the signal and applies it through the transformer 40, 41 to the vertical scanning winding 17 to the scanning yoke.

The amplifier 32 has a non-linear input-output translating characteristic which is used in well known manner to compensate the inherent non-linearity of the trace portion of the saw-tooth component of the scanning signal. The adjustable potentiometer 34, 35 included in the cathode circuit of the amplifier 32 constitutes an adjustable linearity control which controls the operating bias between the control electrode 31 and cathode 33 of the tube 32 and thereby adjustably pre-sets the extent of non-linear modification of the wave form of the scanning signal during its translation by the amplifier 32. Adjustments of the linearity-control potentiometer 34, 35 to attain a desired linearity of the scanning current applied to the vertical winding 17 are made in conventional manner well understood in the art. However, in practice it has heretofore been necessary severely to limit the range of adjustment of the potentiometer 34, 35 to avoid "fold over" of the top of the reproduced television image. Such "fold over" is minimized or entirely avoided in a scanning system embodying the present invention for the reason that any adjustment of the linearity control 34, 35 to adjust linearity by adjusting operating bias and gain of the amplifier 32 also and simultaneously with such adjustment effects the insertion or removal or resistance in series with the peaking resistor 37 so that the pulse component of the scanning signal is accordingly changed. The pulse component is increased in amplitude with increasing gain of the amplifier 32, and vice versa.

If for example the gain of the amplifier 32 is increased, whereby its pulses of anode current during signal translation are correspondingly increased, as by movement of contact 35 of the linearity-control potentiometer toward the cathode 33, more resistance of the potentiometer 34 is included in series with the peaking resistor 37 so that the pulse component of the scanning signal increases. This aids in biasing the tube 32 more fully to cut off during the retrace intervals. Undesirable fold over of the top of the picture is thereby minimized or completely avoided.

While there has been described what is at present considered to be the preferred embodiment of the invention, it will be apparent to those skilled in the art that various changes and modifications may be made therein without departing from the invention. Consequently, the appended claims should be interpreted broadly, as may be consistent with the spirit and scope of the invention.

What I claim is:

1. A television scanning system comprising, means including series connected capacitive and resistive elements for generating a signal of composite saw tooth and pulse wave form, an amplifier having a non-linear input-output amplification characteristic for amplifying said signal, adjustable linearity control means included in said amplifier for adjustably preselecting the extent of non-linear modification of the wave form of said signal during amplification thereof by said amplifier, and means common to said adjustable linearity control means for increasing the pulse component of said signal with increase of gain of said amplifier and for adjusting said resistive element of said generating means concurrently with adjustments of said linearity control means.

2. A structure in accordance with claim 1 in which said adjustable linearity control means is a resistor.

3. A television scanning system comprising means for generating a composite scanning signal including a saw-tooth component and a pulse pedestal component, variable gain translating means having a non-linear input-output characteristic for amplifying said composite signal, and variable means common to said composite signal generating means and said translating means for simultaneously increasing the gain of said translating means and the amplitude of the signal pulse pedestal component of said composite signal.

References Cited in the file of this patent

UNITED STATES PATENTS

| | | |
|---|---|---|
| 2,513,722 | Harris | July 4, 1950 |
| 2,517,715 | Rogers | Aug. 8, 1950 |
| 2,545,346 | Edelsohn | Mar. 13, 1951 |
| 2,559,525 | Vance | July 3, 1951 |
| 2,562,985 | Kronenberg | Aug. 7, 1951 |
| 2,662,981 | Segerstrom | Dec. 15, 1953 |
| 2,752,528 | Aires | June 26, 1956 |

OTHER REFERENCES

"TV Servicing," pub. by Radio Corp. of America, 1951, pp. 13–16.